United States Patent
Tokita et al.

(10) Patent No.: US 6,925,264 B2
(45) Date of Patent: Aug. 2, 2005

(54) OPTICAL TRANSMITTER AND OPTICAL TRANSMITTING APPARATUS USING THE SAME

(75) Inventors: Shigeru Tokita, Yokohama (JP); Atsushi Hasegawa, Yokohama (JP); Takahiro Hamagishi, Yokohama (JP)

(73) Assignee: OpNext Japan, Inc., Kanagawa-ken (JP)

( * ) Notice: Subject to any disclaimer, the term of this patent is extended or adjusted under 35 U.S.C. 154(b) by 633 days.

(21) Appl. No.: 10/071,100

(22) Filed: Feb. 11, 2002

(65) Prior Publication Data

US 2002/0093714 A1 Jul. 18, 2002

Related U.S. Application Data

(62) Division of application No. 09/247,809, filed on Feb. 11, 1999, now Pat. No. 6,559,997.

(30) Foreign Application Priority Data

Feb. 20, 1998 (JP) .......................................... P10-038642

(51) Int. Cl.[7] .............................................. H04B 10/04
(52) U.S. Cl. ...................... 398/182; 398/190; 398/195
(58) Field of Search ................................ 398/182, 183, 398/189, 190, 195, 197, 198

(56) References Cited

U.S. PATENT DOCUMENTS

| 5,548,435 A | * | 8/1996 | Tahara et al. ................ 398/195 |
| 5,900,959 A | * | 5/1999 | Noda et al. .................. 398/195 |
| 6,040,931 A | * | 3/2000 | Miyazaki et al. ............. 398/23 |

FOREIGN PATENT DOCUMENTS

JP            06097889        8/1994

* cited by examiner

*Primary Examiner*—Jason Chan
*Assistant Examiner*—Dzung Tran
(74) *Attorney, Agent, or Firm*—Mattingly, Stanger, Malur & Brundidge, P.C.

(57) ABSTRACT

An optical transmitter for use in an optical transmitting system based on PDS (Passive Double Star) technology, does not erroneously output an optical signal when the optical transmitter is powered on/off. The optical transmitter has a current source 1 for outputting a drive current having a magnitude corresponding to an input control signal, a Laser diode (LD) for generating an optical output signal based on the received drive current, a modulator 9 for controlling the supply and cutoff of the drive current to the Laser diode (LD), a source voltage detector 3 for monitoring a source voltage to detect whether the source voltage is lower than a predetermined voltage, and a switch circuit 4 for outputting a control signal to the current source 1 to stop the supply of the drive current when the source voltage is determined to be lower than the predetermined voltage.

1 Claim, 11 Drawing Sheets

OPTICAL TRANSMITTER AND OPTICAL TRANSMITTING APPARATUS USING THE SAME

This application is a divisional application of U.S. Ser. No. 09/247,809, tiled Feb. 11, 1999 now U.S. Pat. No. 6,559,997.

FIELD OF THE INVENTION

The present invention relates to an optical transmitter, and in particular, to an optical transmitter suitable for use in an optical transmitting system such as one based on PDS (Passive Double Star) technology.

BACKGROUND OF THE INVENTION

FIG. 12 shows a related-art type of optical transmitter. As shown, the optical transmitter is composed of a flip-flop circuit 106, a modulator 109, a Laser diode (hereinafter LD), a current source 101, a photodiode (PD), and an automatic power control circuit 102.

The flip-flop circuit 106 captures a data signal DT in synchronization with a clock signal CL to output light-on/off signals (of positive phase and negative phase). A transistor Q1 and a transistor Q2 of the modulator 109 are supplied at the bases thereof with the positive-phase light-on/off signal and the negative-phase light-on/off signal to perform a differential operation. When the transistor Q2 is turned on, the laser diode (LD) is supplied with a drive current from the current source 101 to generate an optical pulse signal.

The photodiode (PD) converts part of the optical signal outputted from the Laser diode (LD) into an electrical signal. In order to set the amplitude of this electrical signal to a predetermined level, the automatic power control circuit 102 adjusts the magnitude of the current coming from the current source 101. Consequently, the optical output power of the Laser diode (LD) is maintained at a constant level.

Details of the above-mentioned optical transmitter are disclosed in Japanese Laid-open Patent No. Hei 6-97889, for example. In an optical transmission system for use in a public communication network, a station-side communication device is connected to plural subscriber-side communication devices by fiber optics. Some such optical transmission systems are based on PDS technology in which the optical fiber of the station-side communication device is coupled with each of the optical fibers of the plural subscriber-side communication devices through a passive optical divider/coupler such as a star coupler. Also, in the above-mentioned optical transmission system, while communication is being performed between the station-side communication device and one of the subscriber-side communication devices, another subscriber-side device may be powered on/off.

However, in the communication device having the above-mentioned related-art optical transmitter, the circuit operation in the communication device may be made unstable by the power on/off operation, causing the Laser diode (LD) to emit the light erroneously. This erroneous light emission is caused when the source voltage drops more than the threshold, thereby causing the flip-flop circuit 106 to output an error light-on signal to the modulator 109 by way of example. Consequently, if the communication device having the above-mentioned related-art type of optical transmitter is used in an optical transmission system based on PDS technology, the optical signal caused by erroneous light emission at a power on/off operation, affects the optical fibers of other communication devices through the optical divider/coupler, thereby interfering with the communication of these devices.

SUMMARY OF THE INVENTION

It is therefore an object of the present invention to provide an optical transmitter that does not output an optical signal erroneously at a power on/off operation and an optical transmitting apparatus using such an optical transmitter.

In carrying out the invention and according to one aspect thereof, there is provided an optical transmitter having a current source for outputting a drive current having a magnitude corresponding to a control signal to be inputted, a Laser diode that is driven by the drive current for generating an optical output signal, and a modulator for controlling the supply and cutoff of the drive current to the Laser diode, the optical transmitter comprising: a detecting circuit for monitoring a source voltage to detect whether the source voltage is lower than a predetermined voltage and supplied a power supply potential 11 (Vcc) in common with LD; and a control circuit for stopping, if the source voltage is found lower than the predetermined voltage, the supply of the drive current to the Laser diode.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

The invention will be described in further detail by way of example with reference to the accompanying drawings.

Figure 1:
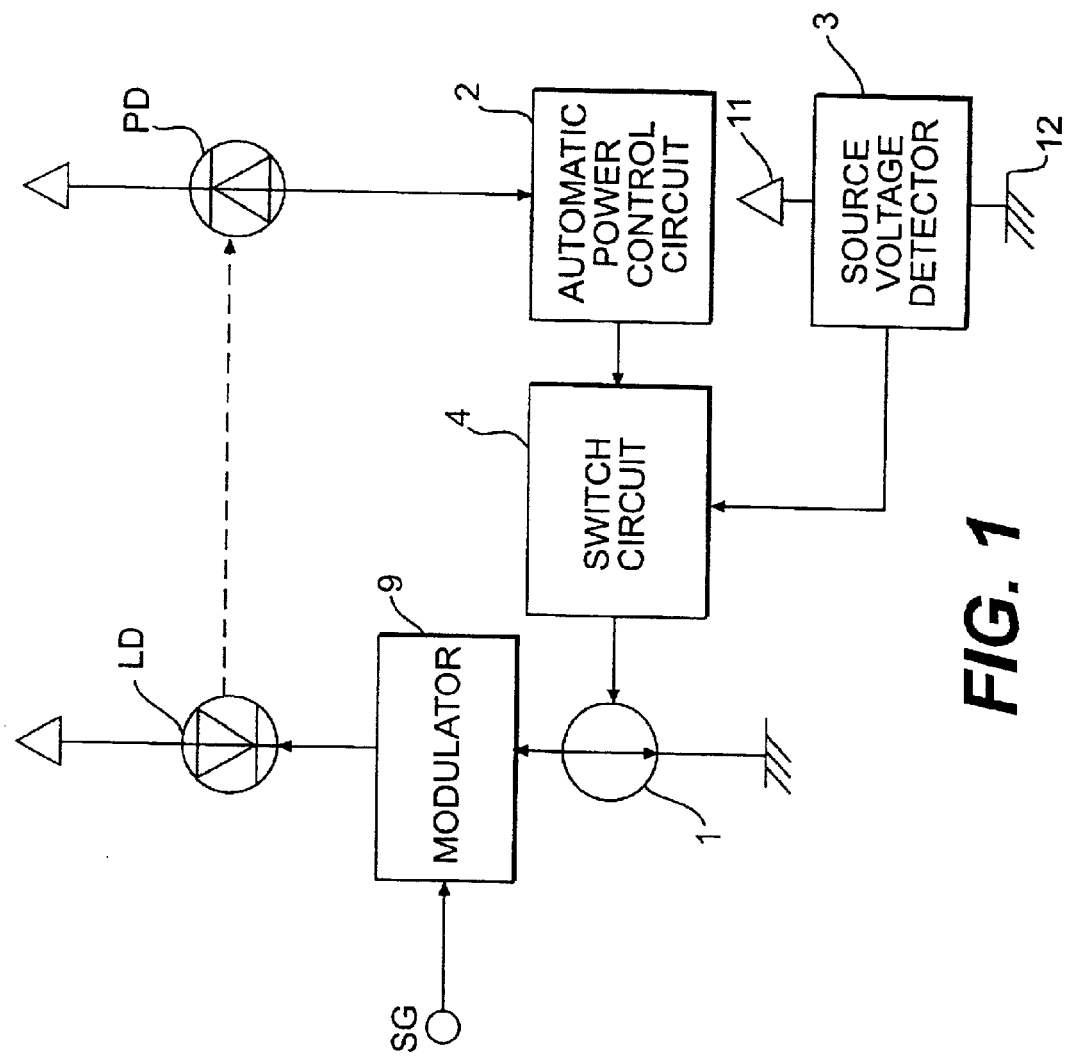
FIG. 1 is a block diagram illustrating a basic configuration of an optical transmitter practiced as a first preferred embodiment of the invention.
Figure 2:
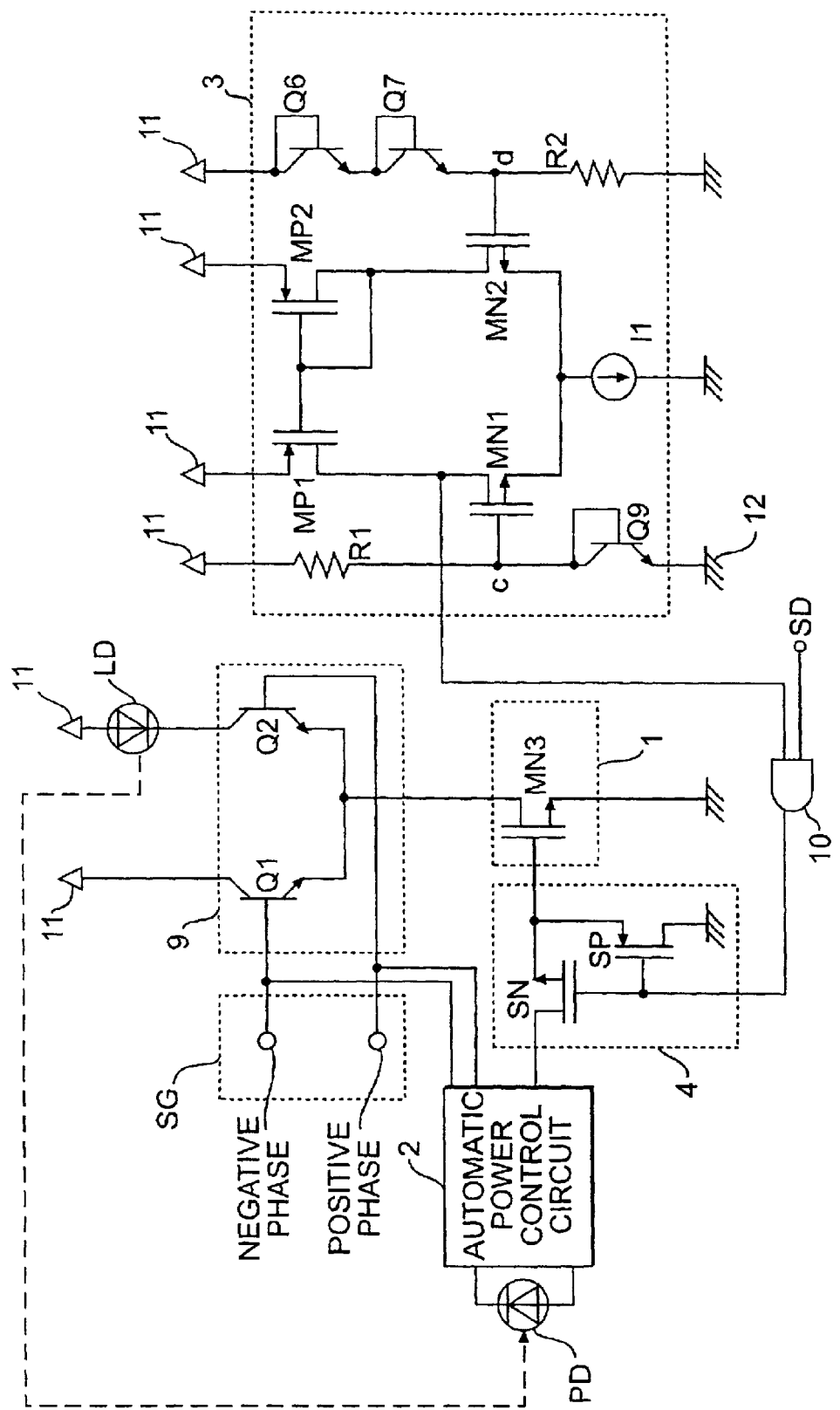
FIG. 2 is a circuit diagram illustrating a circuit configuration of the first preferred embodiment.

Now, referring to FIG. 1, there is shown a basic configuration of an optical transmitter practiced as a first preferred embodiment of the present invention. As shown, the optical transmitter comprises a current source 1 for outputting a drive current, a Laser diode (LD) for generating an optical output signal based on the drive current, a modulator 9 for controlling the supply and cutoff of the drive current to the Laser diode (LD) according to a light-on/off signal (SG), a photodiode (PD) for converting part of the optical output signal into an electrical signal, an automatic power control circuit 2 for maintaining the optical power of the optical output signal at a constant level, a source voltage detector 3 for detecting that the source voltage is lower than a predetermined reference level, and a switch circuit 4 for controlling the current output of the current source 1. The value of the predetermined reference level depends on the type of LD. The first preferred embodiment includes a source voltage detector 3 and a switch circuit 4 that stops the current output of the current source 1 when the source voltage determines that the source voltage is lower than the reference level. Also, when the source voltage exceeds the reference level, the operation of the automatic power control circuit 2 maintains the optical output power of the Laser diode (LD) at a constant level. In this invention, the source voltage detector is supplied with a power supply potential 11 (Vcc) in common with LD. Therefore, the source voltage detector precisely detects whether the source voltage is lower than the predetermined reference level without being influenced by the operation of Ld. FIG. 2 shows a circuit configuration of the optical transmitter. It should be noted that the circuit to be described below assumes that a power supply potential 11 (Vcc) relative to ground potential 12 (GND) is 3.3 V and the level difference between the positive-phase and negative-phase light-on/off signals (SG) is 300 mV.

As shown, the modulator 9 is composed of transistors Q1 and Q2 with the emitters thereof connected is common. The transistors Q2 and Q1 are applied at the bases thereof with the positive-phase and negative-phase light-on/off signals (SG), respectively. When the positive-phase light-on/off signal is at a high level (for example, 2.5 V), the negative-phase light-on/off signal is at a low level (for example, 2.2 V) and vice versa. The transistor Q2 is connected at the collector thereof to the Laser diode (LD) and the emitter thereof to the current source 1, supplying a drive current to the Laser diode (LD) when the inputted light-on/off signal (SG) is high.

The current source 1 is constituted by an N-channel field-effect transistor MN3. This field-effect transistor MN3 adjusts the magnitude of the drive current to be supplied to the Laser diode (LD) according to the level of the signal inputted in the gate of this transistor.

Figure 3:
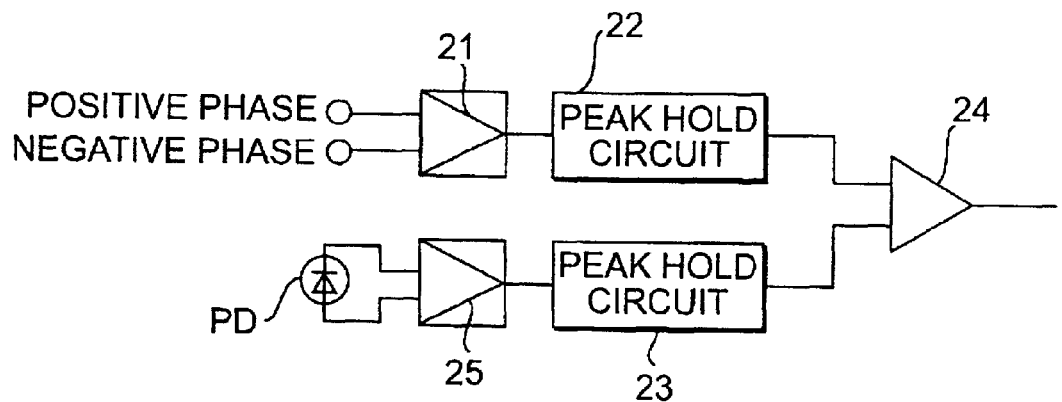
FIG. 3 is a diagram illustrating a constitution of an automatic power control circuit.

The automatic power control circuit 2 is composed of two buffer circuits 21 and 25, two peak-hold circuits 22 and 23, and a comparator 24 as shown in FIG. 3, which outputs an optical output control signal.

The source voltage detector 3 is composed of a first series circuit consisting of a transistor Q9 and a resistor R1, a second series circuit consisting of transistors Q6 and Q7 and a resistor R2, and a comparator consisting of N-channel field-effect transistors MN1 and MN2, P-channel field-effect transistors MP1 and MP2, and a current source 1. It should be noted that use of the field-effect transistors MP1 and MP2 is advantageous in enhancing the accuracy and speed of voltage decision in the comparator over a conventional general arrangement using a resistor instead.

The switch circuit 4 is composed of two switch elements SN and SP. The switch elements SN and SP are constituted by an N-channel field-effect transistor and a P-channel field-effect transistor, respectively.

The following describes the operation of the optical transmitter shown in FIG. 3.

In the automatic power control circuit 2, the positive-phase and negative phase light-on/off signals (SG) are inputted in the buffer 21 for input differential amplification. The amplified output is inputted in the peak-hold circuit 22 in which the maximum level is maintained. On the other hand, the electrical signal outputted from the photodiode (PD) is amplified by the buffer circuit 25 and the maximum level of the amplified signal is maintained in the peak-hold circuit 23. The amplified output from the buffer circuit 21 has a certain offset, which is adjusted beforehand so that the electrical signal outputted from the buffer 21 becomes the same level as that of the electrical signal outputted from the buffer 25 when the positive-phase light-on/off signal (SG) is at the low level. The comparator 24 varies the level of the optical output control signal to be outputted so that the hold outputs of the peak-hold circuits 22 and 23 become equal to each other.

The automatic power control circuit 2 for executing the above-mentioned operations can maintain the optical output power of the light-emitting diode (LD) at a constant level without being affected by the mark ratio (the ratio between high and low levels) of the light-on/off signals (SG).

In the source voltage detector 3, the voltage Vc at point "c" in the first series circuit is represented in relation (1) below. In this relation, Vbe is indicative of the potential between the base and emitter of the transistor, which is about 0.8 V (constant). Like Vbe, the potential that becomes constant relative to ground potential GND regardless of source voltage Vcc is hereafter referred to as a GND reference potential.

$$Vc=Vbe \qquad (1)$$

The potential Vd at point "d" in the second series circuit is represented in relation (2) below. Like potential Vd, a potential that decreases as the supply potential Vcc decreases is hereafter referred to as a Vcc reference potential.

$$Vd=Vcc-2Vbe \qquad (2)$$

Figure 4:
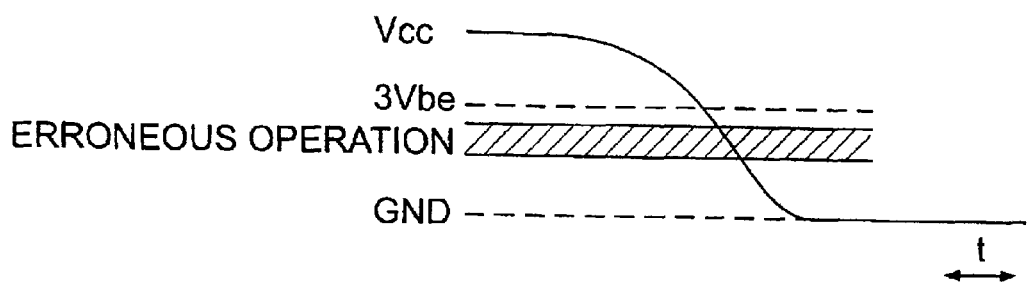
FIG. 4 is a diagram illustrating a relationship between the variation in source voltage Vcc and an abnormal operation.

The gates of the field-effect transistors MN1 and MN2 of the comparator are connected to point "c" and point "d" respectively, so that the field-effect transistor MN1 is OFF when Vd>Vc and ON otherwise. Hence, the voltage decision signal outputted from the comparator becomes the high level (approximately equal to Vcc) when Vd>Vc (namely, when the source voltage Vcc is greater than 3Vbe); otherwise, this signal becomes the low level (approximately equal to GND). 3Vbe is indicative of a predetermined reference potential, for example about 2.4 V (constant). As shown in FIG. 4, 3Vbe becomes higher than the level at which the circuit for generating the light-on/off signals (SG) possibly functions erroneously.

In the switch circuit 4, when the high-level voltage decision signal is inputted from the comparator of the source voltage detector 3, the switch element SN goes on and the switch element SP goes off. Consequently, the optical output control signal is transmitted from the automatic power control circuit 2 to the gate of MN3 of the current source 1 through the switch element SN. This causes the current source 1 to output a current according to the optical output control signal, making the light-emitting diode (LD) emit a laser beam when the transistor Q2 is on.

On the other hand, when the low-level voltage decision signal is inputted in the switch circuit 4 from the comparator of the source voltage detector 3, the switch element SN turns off and the switch element PS turns on. Consequently, supplying of the output signal of the automatic power control circuit 2 to the gate of MN3 of the current source 1 is cut off, setting the potential of the base to approximately the GND level. This causes the current source 1 to stop outputting the current, keeping the Laser diode (LD) in the light-off state also when the transistor Q2 is on.

An AND circuit 10 is normally inputted with a shut-down signal SD of high level (Vcc) to transmit the optical output control signal to the switch circuit 4 without change. When the shut-down signal SD becomes a low level, the AND circuit 10 causes the current source 1 to stop outputting the current by setting the signal to the switch circuit 4 to a low level regardless of the level of the source voltage Vcc. Consequently, the LD of the transmitter might be controlled by the shut-down signal SD notwithstanding the level of the source voltage Vcc.

Thus, the optical transmitter shown in FIG. 2 operates so that the same stops supplying the current to the Laser diode (LD) when the source voltage is lower than 3Vbe regardless of the level of the light-on/off signal (SG). Consequently, no optical signal is outputted due to erroneous light emission at a power on/off operation. In addition, if the source voltage is normal, an optical signal having a constant optical output power can be outputted according to the light-on/off signal (SG).

Figure 5:
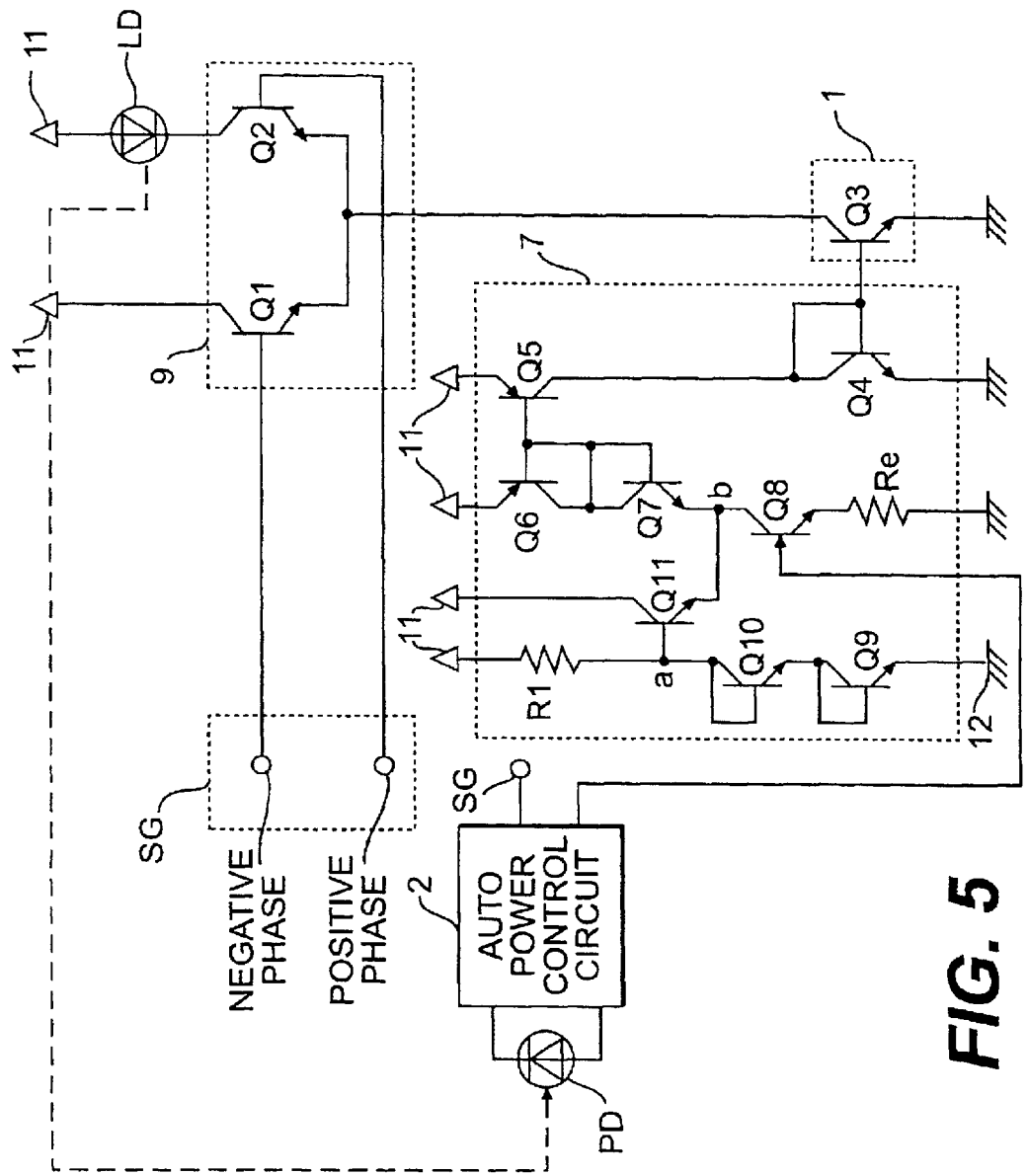
FIG. 5 is a diagram illustrating another circuit configuration of the first preferred embodiment.

FIG. 5 is a circuit diagram of another example of the optical transmitter shown in FIG. 1.

This optical transmitter has a source voltage cutoff circuit 7 in which the capabilities of the source voltage detector 3 shown in FIG. 2 are incorporated. An automatic power control circuit 2, a modulator 9, and a Laser diode (LD) are generally the same in capability as those shown in FIG. 2. For a current source 1, a transistor Q3 is used, the Laser diode (LD) being driven by the collector current of the transistor Q3.

In the source voltage cutoff circuit 7, a transistor Q8 is controlled in the corrector current thereof by an optical output control signal generated by the automatic power control circuit 2. Transistors Q4 through Q7 constitute a current-mirror circuit. When the source voltage Vcc is normal, the collector current of the transistor Q8 is transmitted to the collector of the transistor Q4. According to this collector current, the potential of the base of the transistor Q4 varies, thereby controlling the magnitude of the output current of the current source 1.

Potential Va at point "a" of a series circuit composed of transistors Q9 and Q10 and a resistor R1 becomes a potential relative to GND represented in relation (3) below.

$$Va = 2Vbe \quad (3)$$

On the other hand, potential Vb at point "b" of a series circuit composed of the transistors Q6 and Q7 becomes a potential relative to Vcc represented in relation (4) below.

$$Vb = Vcc - 2Vbe \quad (4)$$

A transistor Q11 is connected at the base thereof to point "a" and at the emitter thereof to point "b". Hence, a condition in which the transistor Q11 is turned on is represented in relation (5) below.

$$Va - Vb > Vbe \quad (5)$$

If the source voltage Vcc is lower than 3Vbe, the condition of relation (5) is satisfied, so that conduction is provided between the collector and emitter of the transistor Q11, allowing the collector current of the transistor Q8 to flow through the transistor Q11. This allows little current to flow to the transistor Q6, thereby preventing the collector current of the transistor Q8 from being transmitted to the transistor Q4. This consequently stops the current output of the current source 1.

As described, the optical transmitter shown in FIG. 5 operates such that the current supply to the Laser diode (LD) is stopped if the source voltage is lower than 3Vbe regardless of the level of the light-on/off signal (SG). Therefore, no erroneous optical signal is outputted at a power on/off operation. If the source voltage is normal, the optical transmitter shown in FIG. 5 can output a constant optical output signal according to the light-on/off signal (SG). Further, as compared with the circuit shown in FIG. 2, the transistors used in the circuit configuration of this optical transmitter can all be of a bipolar type, thereby facilitating integration of a this optical transmitter into one chip.

Figure 6:
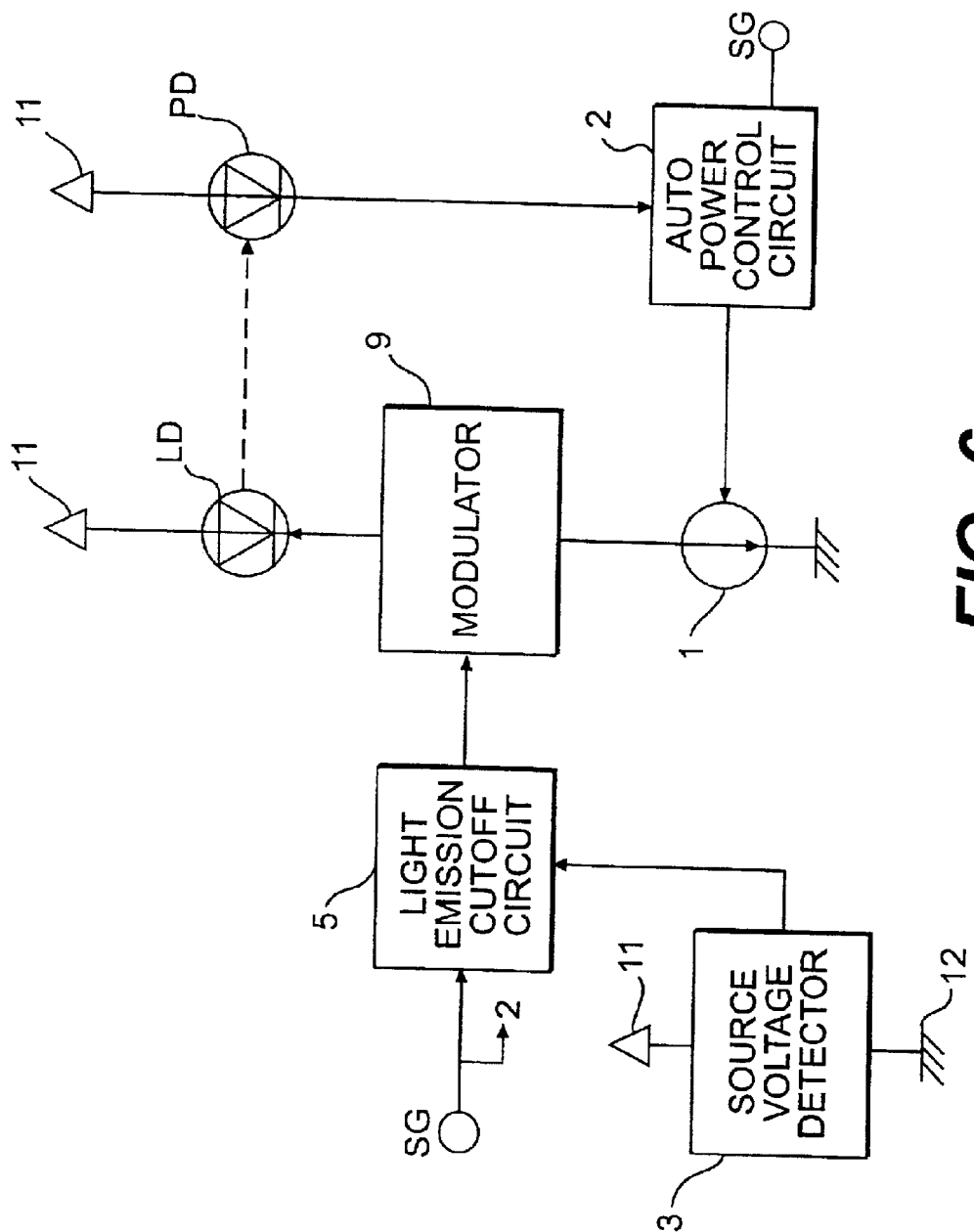
FIG. 6 is a block diagram illustrating a basic configuration of an optical transmitter practiced as a second preferred embodiment of the invention.

FIG. 6 is a block diagram illustrating the basic configuration of the optical transmitter practiced as an alternative embodiment. As shown, this embodiment comprises a current source 1, a modulator 9, a Laser diode (LD), a photodiode (PD), an automatic power control circuit 2, a source voltage detector 3, and a light emission cutoff circuit 5. The components other than the light emission cutoff circuit 5 have generally the same capabilities as those of the components described with reference to FIG. 1.

The light emission cutoff circuit 5 has a capability of controlling the level of the light-on/off signal inputted in the modulator 9. When the source voltage is lower than the reference level, the light emission cutoff circuit 5 sets the level of the light-on/off signal to the level at which the modulator 9 cuts off the drive current.

This embodiment may be provided with the capability of controlling the current output of the current source 1 by the switch circuit 4 described with reference to FIG. 1. If this capability is provided, the erroneous light emission of the Laser diode (LD) can be prevented more reliably.

Figure 7:
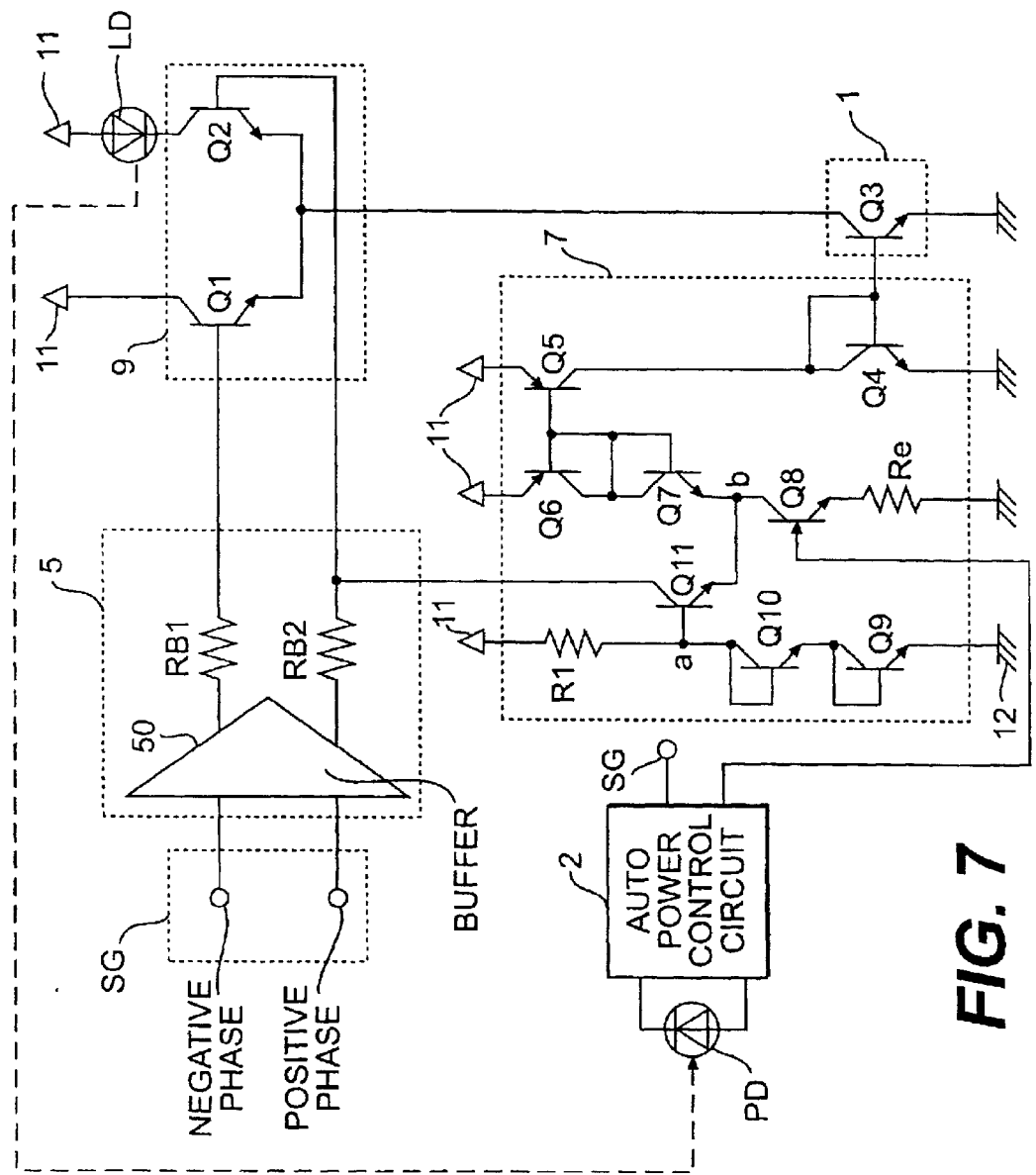
FIG. 7 is a circuit diagram illustrating a circuit configuration of the second preferred embodiment.

FIG. 7 shows a circuit configuration added with the capability of controlling the current output of the current source 1.

The light emission cutoff circuit 5 is composed of a 2-input/2-output buffer circuit 50 and base resisters RB1 and RB2 connected respectively to the outputs of the buffer circuit 50. Positive-phase and negative-phase light-on/off signals are inputted respectively in the inputs of the buffer circuit 50. The outputs of the light emission cutoff circuit 5 are connected respectively to the bases of the transistors Q2 and Q1 constituting the modulator 9.

A switch circuit 7 has generally the same configuration as that of the switch circuit shown in FIG. 5. However, a difference lies in that, while the source voltage Vcc is supplied to the collector of the transistor Q11 in the switch circuit shown in FIG. 5, the positive-phase output signal line of the light emission cutoff circuit 5 is connected to the collector of the transistor Q11 in the switch circuit 7.

When the source voltage Vcc is normal, the switch circuit 7 performs generally the same operation as that of the switch circuit shown in FIG. 5, transmitting the optical output control signal to the current source 1 to output therefrom the drive current having a magnitude according to the optical output control signal.

When the source voltage Vcc is lower than 3Vbe, the transistor Q11 is on, so that the collector current of the transistor Q11 flows from the buffer circuit 50 through the base resistor RB2. For example, if the base resistor RB2 is set to 200 ohms and the collector current of the transistor Q11 to 3 mA, then, when the transistor Q11 is on, the base voltage of the transistor Q2 drops by 600 mV, surely going lower than the base voltage of the transistor Q1. This turns off the transistor Q2, stopping the current supply to the Laser diode (LD).

As described, the optical transmitter shown in FIG. 7 operates such that, when the source voltage becomes lower than 3Vbe, the current output of the current source 1 is stopped and, at the same time, the light-on/off signals are set to a level at which the modulator 9 cuts off the drive current. This prevents with reliability the erroneous light emission of the Laser diode (LD) from occurring.

Figure 8:
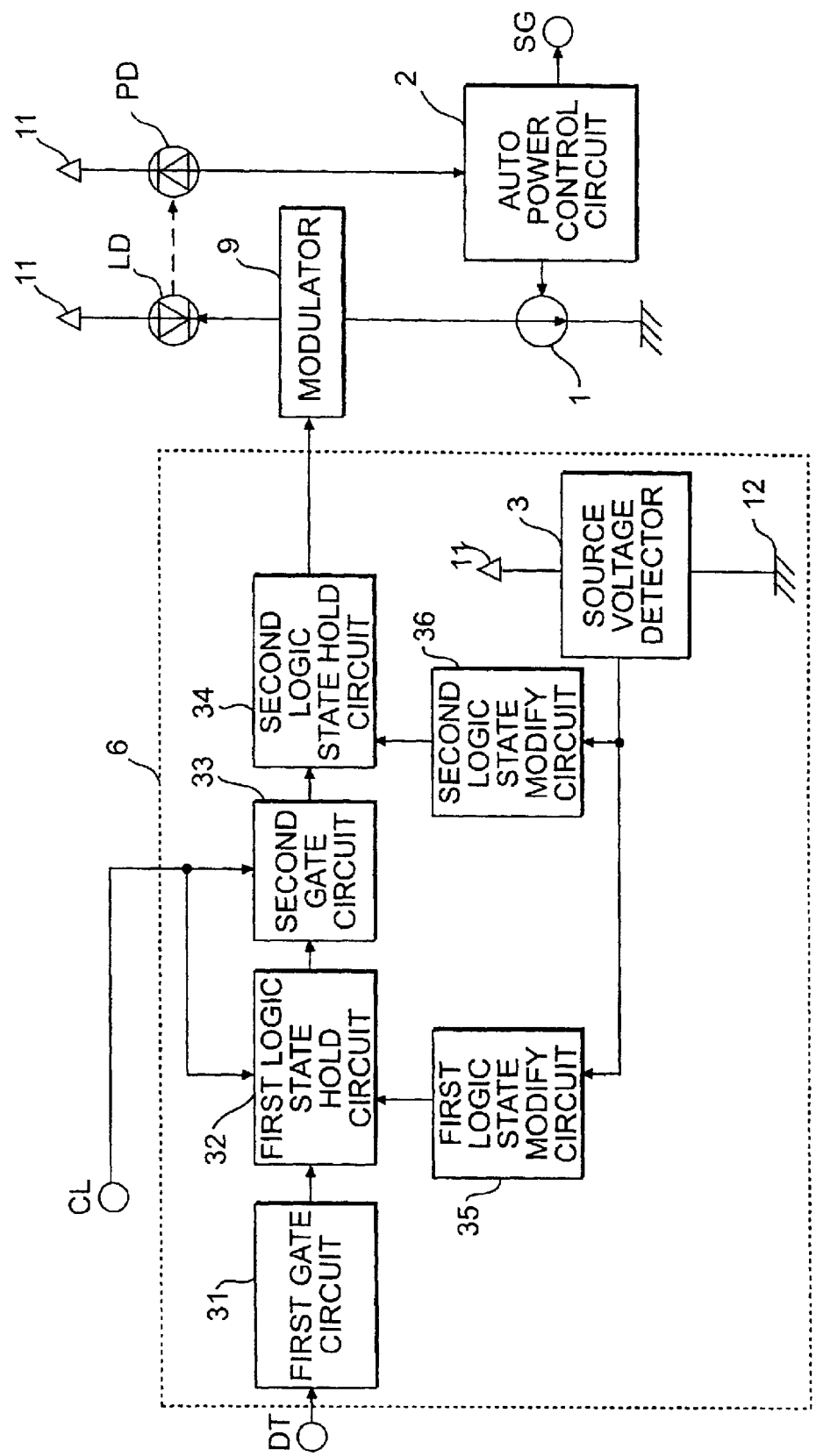
FIG. 8 is a block diagram illustrating a basic configuration of an optical transmitter practiced as a third preferred embodiment of the invention.

FIG. 8 is a block diagram illustrating the basic arrangement of an optical transmitter practiced as a third preferred embodiment of the invention, the optical transmitter using a flip-flop circuit 6 associated with the invention. As shown, the third preferred embodiment comprises a current source 1, a modulator 9, a Laser diode (LD), a photodiode (PD), an automatic power control circuit 2, and the flip-flop circuit 6. The components of the third preferred embodiment other than the flip-flop circuit 6 have generally the same capabilities as those of the first or second preferred embodiment.

The flip-flop circuit 6 generates a light-on/off signal (SG) based on a data signal DT and a clock signal CL that are supplied externally and outputs the generated light-on/off signal (SG) to the modulator 9. If the source voltage is lower than a predetermined reference voltage, the level of the light-on/off signal (SG) is set to a level at which the modulator 9 cuts off the drive current. Further, the state in which the drive current is cut off is kept until, after the source voltage goes over the reference voltage, the data signal DT and the clock signal CL for directing light emission are supplied.

The flip-flop circuit 6 comprises a first gate circuit 31 for sampling the data signal DT in synchronization with the clock signal CL, a first logic state hold circuit 32 for holding an output of the first gate circuit 31, a second gate circuit 33 for sampling the output of the first logic state hold circuit 32 in synchronization with the clock signal CL, a second logic state hold circuit 34 for holding an output of the second gate circuit 33, a source power detector 3 for detecting that the source voltage is lower than the predetermined reference voltage, and first and second logic state modify circuits 35 and 36 for putting the hold states of the first and second logic state hold circuits 32 and 34 respectively into the low level states when the source voltage is lower than the reference voltage.

The gate circuit 31, the logic state hold circuit 32, the gate circuit 33, and the logic state hold circuit 34 constitute a D-type flip-flop of master-slave type.

Figure 9:
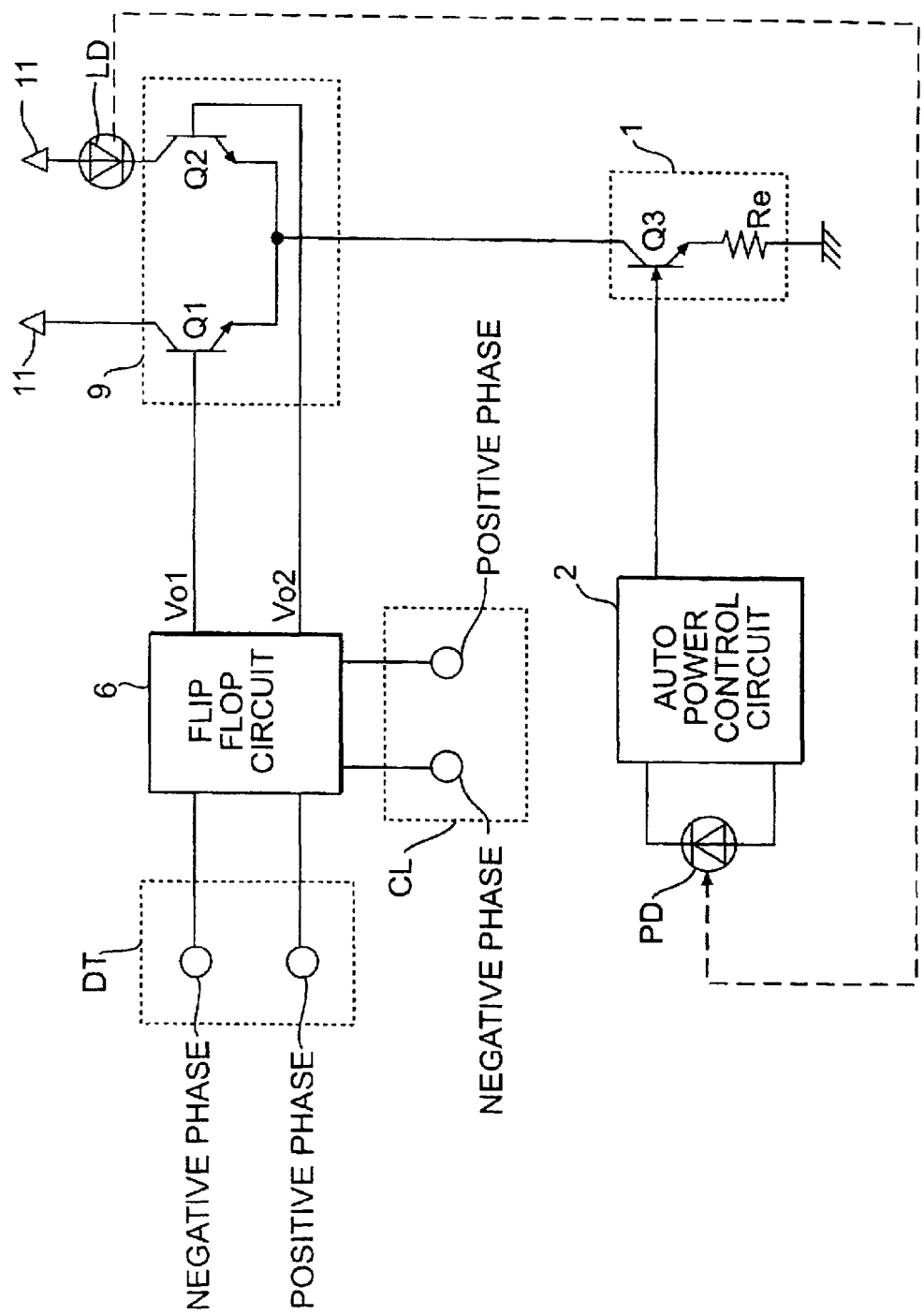
FIG. 9 is a circuit diagram illustrating a circuit configuration of the third preferred embodiment.
Figure 10:
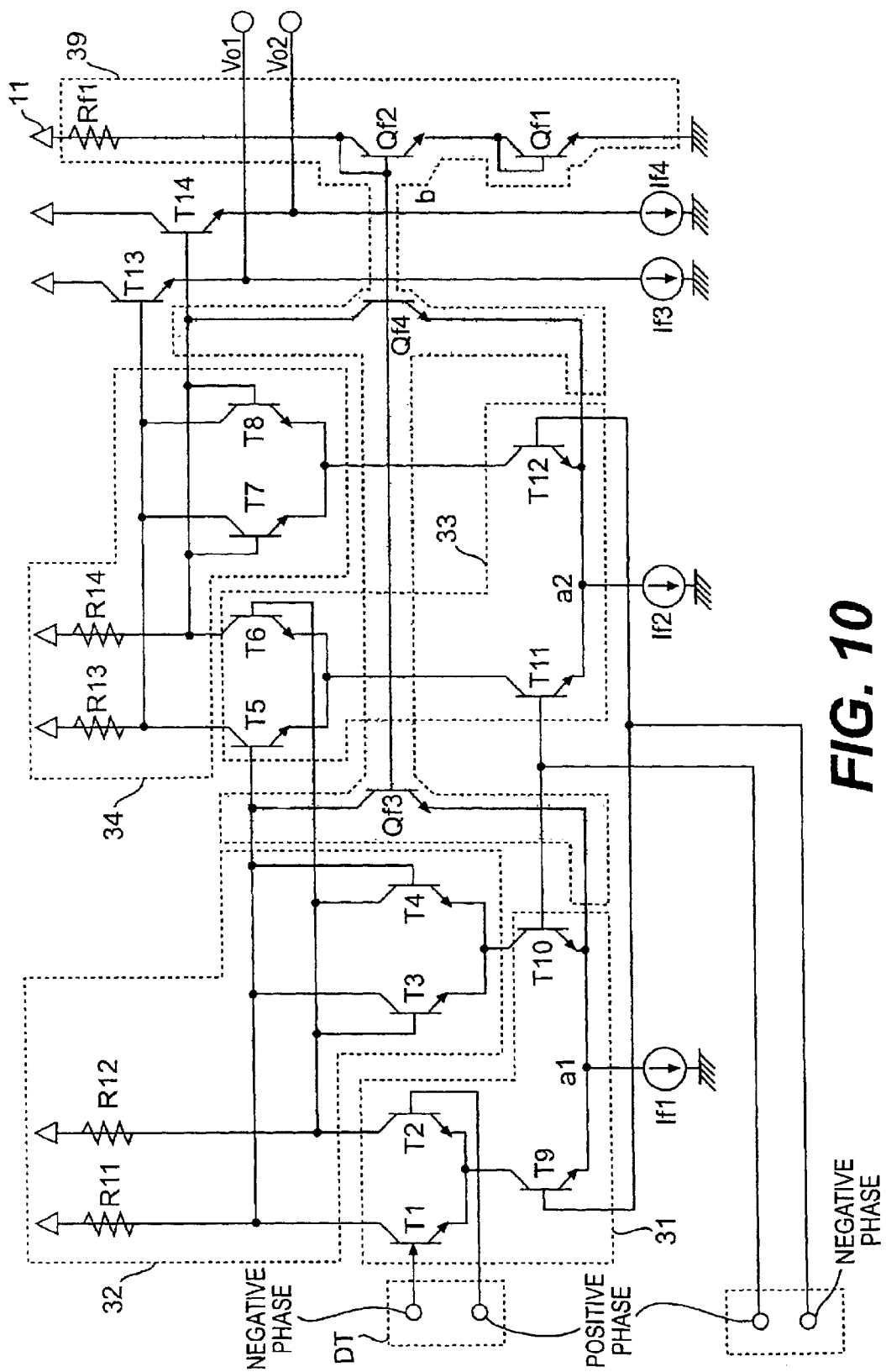
FIG. 10 is a circuit diagram illustrating a circuit configuration of a flip-flop circuit 6 shown in FIG. 9.

FIGS. 9 and 10 show a circuit configuration of the optical transmitter using the flip-flop circuit 6.

Referring to FIG. 9, the base of the transistor Q3 for use as the current source 1 is supplied with the optical output control signal of the automatic power control circuit 2. Output signals Vo1 and Vo2 of the flip-flop circuit 6 are supplied to the bases of the transistors Q1 and Q2 respectively of the modulator 9. Here, the flip-flop circuit 6 is supplied with Vcc-reference data signal DT and clock signal CL.

FIG. 10 shows a circuit configuration of the flip-flop circuit 6.

In the figure, the first gate circuit 31 is composed of transistors T1, T2, T9, and T10. The first logic state hold circuit 32 is composed of registers R11 and R12 and transistors T3 and T4. The second gate circuit 33 is composed of transistors T5, T6, T11, and T12. The second logic state hold circuit 34 is composed of resistors R13 and R14 and transistors T7 and T8.

The source voltage detector 3 and the first and second logic state modify circuits 35 and 36 are integrated into a logic state modify circuit 39. This logic state modify circuit 39 is composed of transistors Qf1, Qf2, Qf3, and Qf4, and a resistor Rf1.

The following describes the operation of the optical transmitter shown in FIGS. 9 and 10.

The positive-phase and negative-phase clock signals CL are inputted in the transistors T10 and T11 and the transistors T9 and T12, respectively, of the gate circuits 31 and 33. At this moment, the potentials at point "a1" and point "a2" become Vcc reference voltage Va. Point "b" of the series circuit constituted by the transistors Qf1 and Qf2 and the resistor Rf1 presents GND reference voltage Vb.

The transistors Qf3 and Qf4 are connected at the bases thereof commonly to point "b", at the emitters thereof to point "a1" and point "a2", respectively, and the collectors thereof to one of the differential output pair of the logic state hold circuit 32 and one of the differential output pair of the logic state hold circuit 34, respectively.

Consequently, when Vb−Va>Vbe, where the source voltage Vcc goes lower than the normal operating level of the flip-flop circuit, the transistors Qf3 and Qf4 are turned on, providing conductance between the collector and emitter of each of these transistors. This causes the currents of current sources If1 and If2 to flow through load resistors R11 and R14 through the transistors Qf3 and Qf4 respectively, thereby fixing the outputs of the logic state hold circuits 32 and 33 on the sides connected to the resistors R11 and R14 respectively to the low level. Further, the levels of the other outputs of the logic state hold circuits 32 and 34 are also fixed, thereby setting the potential of the output of the flip-flop circuit 6 to the state of Vo1>Vo2. This causes modulator 9 to cut off the drive current of the Laser diode (LD).

Thus, in the optical transmitter shown in FIG. 9, the modulator 9 performs the operation of cutting off the drive current when Vb−Va>Vbe in which the source voltage Vcc goes lower than the normal operating level, so that no optical signal is erroneously outputted at a power on/off operation.

In addition, in this flip-flop circuit 6, the logic state hold circuits 32 and 34 hold the output state established when Vb−Va>Vbe until inputting of the data signal DT and the clock signal CL starts after the source voltage goes over the normal operating level (Vb−Va <Vbe). Therefore, the output of the flip-flop circuit 6 is kept in the state of Vo1>Vo2, thereby continuing the state in which the drive current of the Laser diode (LD) is cut off.

In related-art flip-flop circuits, whether the output when the source voltage has gone up to the normal operating level is high or low is uncertain. This possibly causes erroneous light emission even after the source voltage has gone up to the normal operating level.

On the contrary, in the optical transmitter shown in FIG. 9, even when the source voltage exceeds the normal operating level, the cutoff of the drive current of the Laser diode (LD) is continued until inputting of the data signal DT and the clock signal CL starts, thereby preventing the erroneous light emission at a power on/off operation.

Figure 11:
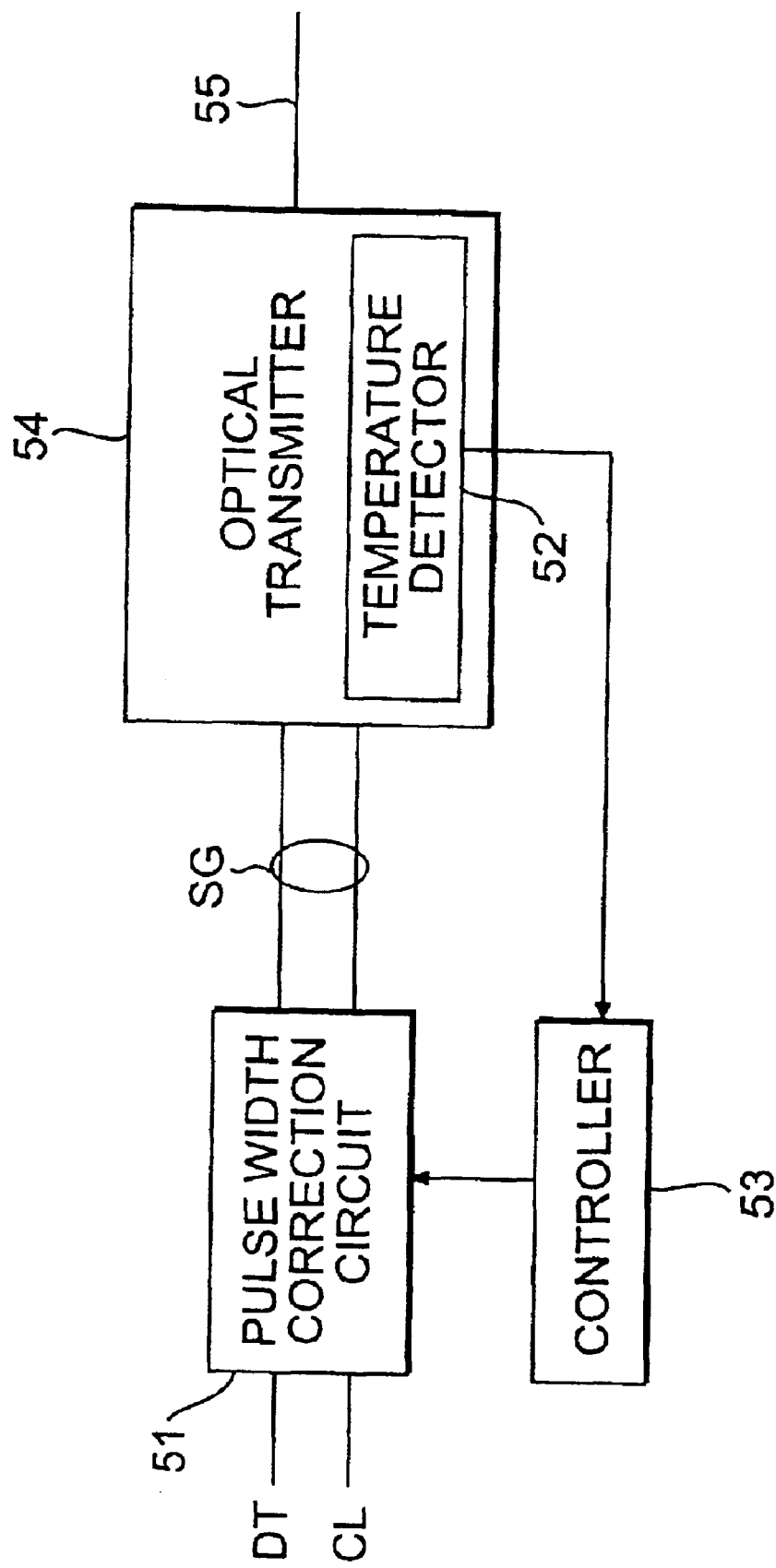
FIG. 11 is a diagram illustrating a configuration of an optical transmitter having a temperature-compensating capability.
Figure 12:
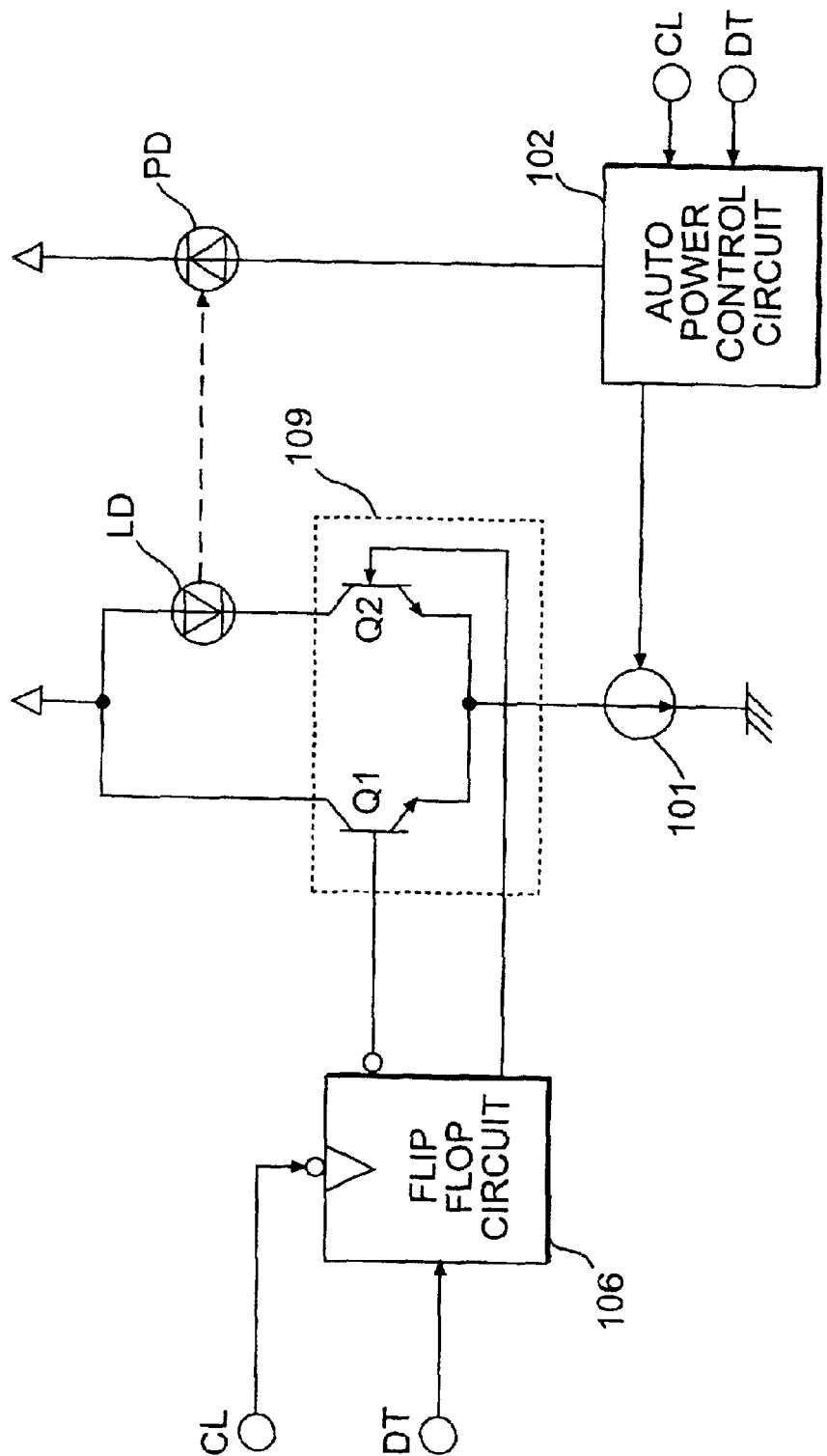
FIG. 12 is a block diagram illustrating a configuration of a related-art type of optical transmitter.

FIG. 11 is a block diagram illustrating a configuration of an optical transmitting apparatus having a temperature compensating capability. The Laser diode (LD) has a characteristic that the pulse width of the output optical signal varies with temperature. To compensate for this variation, the optical transmitter shown in FIG. 11 has a pulse width correction circuit 51, a temperature detector 52, a controller 53, an optical transmitter 54, and an optical fiber 55. For the optical transmitter 54, any of the above-mentioned embodiments is available. The optical output signal of the Laser diode (LD) in the optical transmitter 54 is transmitted through the optical fiber 55.

The pulse width correction circuit 51 generates light-on/off signals (SG) according to a data signal and a clock signal CL. The pulse width correction circuit 51 also varies, according to a control signal generated by the controller 53, the period in which the high level of the light-on/off signal (SG) to be outputted is maintained. The temperature detector 52 measures the temperature of the Laser diode (LD) in the optical transmitter. Based on the result of this measurement, the controller 53 outputs a control signal to the pulse width correction circuit 51 so that the optical output signal of the Laser diode (LD) is corrected to a proper width. For example, if the pulse width of the optical output signal is smaller than the specified value due to temperature variation, the controller 53 controls the period such that the period in which the light-on/off signal (SG) is at the high level is continued longer.

Each of the optical transmitters practiced as the preferred embodiments of the invention is combined with an optical receiver, not shown, into an optical communication device. This optical communication device is especially effective for use in an optical transmission system in which, like the PDS technology, plural optical communication devices are interconnected in a star by a passive optical divider/coupler such as a star coupler. In other words, by using each of the above-mentioned optical transmitters, a system is realized in which communication between optical communication devices is not interfered with by a power on/off operation performed on each optical communication device.

As described and according to the invention, there is provided an optical transmitter that does not erroneously output an optical signal when the optical transmitter is powered on/off.

While the preferred embodiments of the present invention have been described using specific terms, such description is for illustrative purposes only, and it is to be understood that changes and variations may be made without departing from the spirit or scope of the appended claims.

What is claimed is:

1. The optical transmitter for coupling to communication devices though an optical divider/coupler, having a source outputting a drive current, a light-emitting element, for outputting an optical signal to an optical fiber coupled to at least one of the communication devices, that is driven by the drive current for generating an optical output signal and, a modulator controlling the supply and cutoff of the drive current to the light-emitting element, comprising:

a detecting circuit that detects a source voltage; and a control circuit that stops, if the detected source voltage is lower than the predetermined voltage, the supply of the drive current to the light-emitting element, further comprising a temperature detector that measures a temperature of the light-emitting element and a pulse width correction circuit for varying, according to a measured temperature, a pulse width of a light-on/off signal to be supplied to the modulator.

* * * * *